United States Patent Office 3,740,407
Patented June 19, 1973

3,740,407
DIHYDRO-3-(4-HYDROXY-1-PHENETHYL-4-PIPERIDYL)-2-(3H)-FURANONES
Anton Ebnöther, Arlesheim, and Erwin Rissi, Basel, Switzerland, assignors to Sandoz Ltd. (also known as Sandoz AG), Basel, Switzerland
No Drawing. Continuation-in-part of abandoned application Ser. No. 52,736, July 6, 1970. This application May 1, 1972, Ser. No. 249,222
Int. Cl. C07d 29/24
U.S. Cl. 260—293.67                                   23 Claims

ABSTRACT OF THE DISCLOSURE

The invention concerns novel compounds of formula:

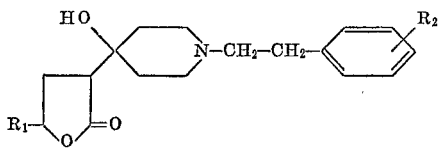

wherein $R_1$ is hydrogen or lower alkyl, and $R_2$ is hydrogen, fluorine, chlorine, bromine, lower alkyl, lower alkoxy or lower alkylthio, cyano, amino or trifluoromethyl, or —$NHCOR_3$, wherein $R_3$ is lower alkyl, and pharmaceutically acceptable acid addition salts thereof.

The compounds of Formula I possess useful analgesic properties.

Processes for the production of the compounds I are also described.

---

This application is a continuation-in-part of S.N. 52,736, filed July 6, 1970, and now abandoned.

The present invention concerns new compounds of Formula I,

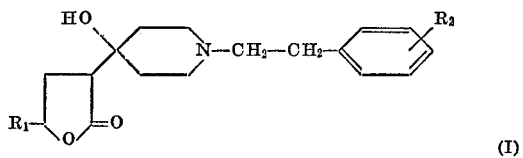

wherein $R_1$ is hydrogen or lower alkyl, and
wherein $R_2$ is hydrogen, fluorine, chlorine, bromine, lower alkyl, lower alkoxy or lower alkylthio, cyano, amino or trifluoromethyl, or —$NHCOR_3$,
wherein $R_3$ is lower alkyl.

In accordance with the invention compounds of Formula I are obtained by
(a) Condensing a compound of Formula II,

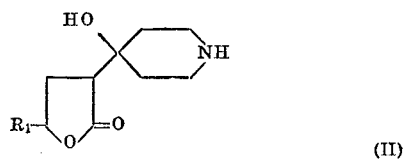

wherein $R_1$ is as defined above,
in an inert solvent and in the presence of an acid-binding agent, with a compound of Formula III,

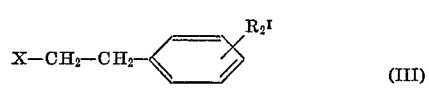

wherein $R_2^I$ is hydrogen, fluorine, chlorine, bromine, lower alkyl, lower alkoxy or lower alkylthio, cyano, m-amino, p-amino or trifluoromethyl, or —$NHCOR_3$, wherein $R_3$ is a defined above, and
X is the acid radical of a reactive ester, to produce a compound of Formula Ia,

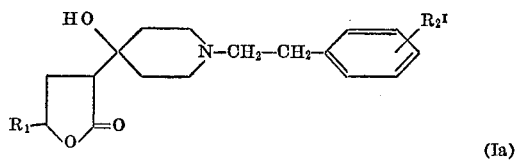

wherein $R_1$ and $R_2^I$ are as defined above, or
(b) Reacting a compound of Formula IV,

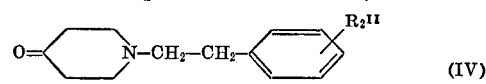

wherein $R_2^{II}$ is hydrogen, fluorine, chlorine, bromine, lower alkyl, lower alkoxy or lower alkylthio, amino or trifluoromethyl,
with a compound of Formula V,

wherein $R_1$ is as defined above,
in an inert solvent and in the presence of a basic condensation agent, and the resulting reaction product is hydrolyzed, to produce a compound of Formula Ib,

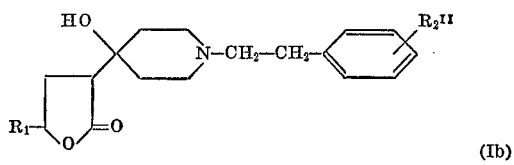

wherein $R_1$ and $R_2^{II}$ are as defined above, or
(c) Reducing the nitro radical to the amino radical in a compound of Formula Id,

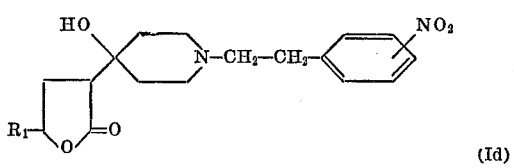

wherein $R_1$ is as defined above,
to produce a compound of Formula Ic,

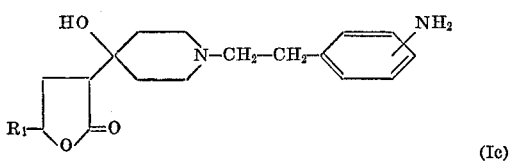

wherein $R_1$ is as defined above.

The lower alkyl radicals represented by the symbols $R_1$, $R_1^I$ and $R_3$, and the lower alkyl, lower alkoxy and lower alkylthio radicals represented by the symbols $R_2$, $R_2^I$ and $R_2^{II}$ and $R_2^{III}$ preferably have a chain length of 1 to 4 carbon atoms and especially signify the methyl, methoxy or methylthio radical.

Examples of inert solvents which may be used in process (a) are aromatic hydrocarbons such as benzene, toluene or xylene, di(lower)alkylamides of lower aliphatic monocarboxylic acids such as dimethyl formamide, or chlorinated aliphatic hydrocarbons such as chloroform or carbon tetrachloride. Examples of acid-binding agents which may be used are alkali metal carbonates such as potassium carbonate or sodium carbonate, tertiary amines such as triethyl amine or pyridine, or an excess of the compounds of Formula II. In the compounds of Formula III, X may, for example, signify chlorine, iodine or the acid radical of an organic sulphonic acid, e.g. an alkyl-sulphonyloxy or aryl-sulphonyloxy radical, preferably, however, bromine. The reaction may be accelerated by heating and/or mixing the reaction mixture thoroughly; the reaction is preferably effected at a slightly elevated temperature between 30° and 100° C. and while stirring.

Process (a) may, for example, be effected by adding the compound of Formula II and the acid-binding agent, e.g. an alkali metal carbonate, preferably potassium carbonate, to a solvent such as toluene or dimethyl formamide, and gradually adding the compound of Formula III at room temperature or at a slightly elevated temperature, e.g. between about 30° and 70° C., while stirring. The reaction mixture is subsequently heated, for example while stirring, preferably at a temperature between 30° and 100° C., and after the reaction is complete (about ½ to 5 hours), is poured, e.g., into water. The compounds of Formula I may be isolated from the reaction mixture in the usual manner and may be purified in accordance with known methods.

Examples of inert solvents which may be employed in process (b) are liquid ammonia, a saturated cyclic ether such as technical grade water-free tetrahydrofuran or an aromatic hydrocarbon such as technical grade water-free toluene. Impurities in the technical grade cyclic ether or aromatic hydrocarbon solvent act as a catalyst in the reaction. Preferably, the reaction is effected in an inert gas atmosphere, e.g. in an atmosphere of nitrogen and in the presence of a catalyst, e.g. an organic peroxide such as tert.butyl hydroperoxide, or preferebly dimethyl sulfoxide. Examples of basic condensation agents which may be used are alkali metal amides such as lithium amide or sodium amide. The reaction temperature may range between about —35° and +60° C., dependent on the solvent used. Hydrolysis of the reaction product may, for example, be effected with aqueous solutions of alkali metal carbonates such as potassium carbonate.

Process (b) may, for example, be effected by suspending the basic condensation agent, e.g. sodium amide, at a low temperature, e.g. about —10° C., in an inert solvent, e.g. in toluene such as described, and gradually adding a solution of the compound of Formula IV and of Formula V, preferably in the same solvent. The reaction mixture is stirred for an extended period, e.g. 10 to 25 hours, at a low temperature, e.g. —10° C., and the reaction product is subsequently decomposed, e.g. with aqueous potassium carbonate. The compounds of Formula I may be isolated from the reaction mixture in the usual manner and may be purified in accordance with known methods.

Reduction in accordance with process (c) may, for example, be effected by catalytic hydrogenation in an inert solvent. A lower alcohol such as ethanol may, for example, be used as inert solvent, and platinum oxide, Raney nickel or palladium on active charcoal may, for example, be used as hydrogenation catalyst. However, process (c) may likewise be effected with zinc in dilute acetic acid, or with iron in dilute acetic or hydrochloric acid.

The compounds of Formula I may be converted into acid addition salts and free bases may be liberated from salts in conventional manner.

Of the compounds of Formula II the compound of Formula IIa

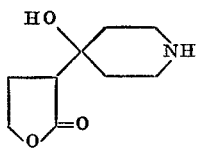

(IIa)

is known. The compounds of Formula IIb,

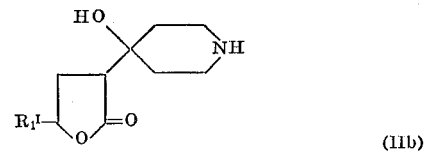

(IIb)

wherein $R_1^I$ is lower alkyl, are new and may be obtained by removing the benzyl radical from a compound of Formula VI,

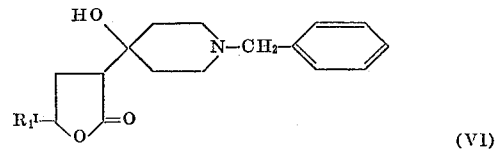

(VI)

wherein $R_1^I$ is as defined above.

This removal of the benzyl radical may, for example, be effected by catalytic hydrogenation of a compound of Formula VI in an inert solvent, e.g. glacial acetic acid, preferably with the use of a palladium catalyst, at a slightly elevated pressure and temperature (e.g. 6 atmospheres/60° C.).

The compounds of Formula VI may, for example, be produced by reacting 1-benzyl-4-piperidone in the presence of an alkali metal amide, e.g. lithium or sodium amide, in an inert solvent, e.g. liquid ammonia and/or absolute ether, absolute dioxane or toluene, with a γ-lactone of Formula Va,

(Va)

wherein $R_1^I$ is as defined above, and hydrolyzing the resulting reaction product, e.g. with an aqueous ammonium chloride solution. The reaction is analogous to process (b) described above, and similar considerations apply with respect to solvent and catalyst.

The compounds of Formula IV may, for example, be obtained by (a') Reacting the corresponding phenethyl amines with acrylic acid ester, subjecting the resulting compounds of Formula VII,

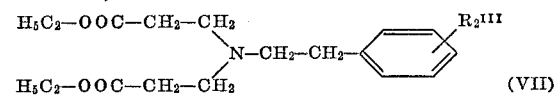

(VII)

wherein $R_2^{III}$ is hydrogen, fluorine, chlorine, bromine, lower alkyl, lower alkoxy or lower alkylthio, or trifluoromethyl, to a Dieckmann cyclization, saponifying the resulting β-keto esters and subsequently decarboxylating the resulting acid, to produce a compound of Formula IVa,

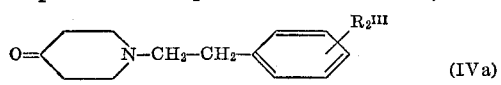

(IVa)

wherein $R_2^{III}$ is as defined above, or (b') Saponifying compounds of Formula VIII,

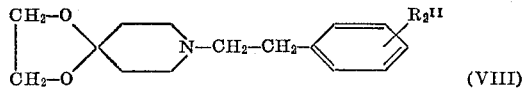

(VIII)

wherein $R_2^{II}$ is as defined above, with a dilute mineral acid.

Dilute hydrochloric acid, sulphuric acid or phosphoric acid may, for example, be used as dilute mineral acid in process (b'); the reaction is conveniently effected at an elevated temperature, especially at 50° C. to the boiling temperature of the reaction mixture, and has a duration of 2 to 24 hours.

Compounds of Formula VIII may be obtained by reacting the compound of Formula IX

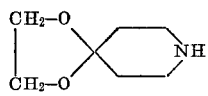

with a compound of Formula IIIa,

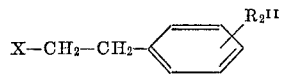

wherein X and $R_2^{II}$ are as defined above,
in a manner analogous to that described in process (a).

Compounds of Formula Id may be obtained in a manner analogous to that described in process (a).

The compounds of Formula I and pharmaceutically acceptable acid addition salts thereof are useful because they possess pharmacological properties in animals. More particularly, the compounds are useful as analgesics as indicated by their properties in the hot plate test in mice, in the tail pinch test in mice, in the electric stimulation test in rhesus monkeys, in the bradyquinine pain test in dogs and also by their properties in inhibiting the phenyl benzoquinone syndrome in mice.

For the above-mentioned use, the dosage administered will naturally vary dependent on the compound employed, the mode of administration, and the condition to be treated. However, satisfactory results are generally obtained in test animals at a dose of 1 to 75 mg./kg. of body weight, conveniently administered in divided doses 2 to 3 times a day or in retard form. For larger mammals the daily dose amounts to about 30 to 180 mg., and a unit dosage form suitable for oral administration contains from about 10 to 90 mg. of the compound admixed with a solid or liquid pharmaceutical carrier or diluent.

The compounds of Formula I, as opposed to known analgesics, do not exhibit a depression of respiration, as can be observed in respiration tests in guinea pigs.

Insofar as the production of the starting materials is not described, these are known or may be produced in accordance with known processes, or in a manner analogous to the processes described herein, or to known processes.

In the following non-limitative examples all temperatures are indicated in degrees centigrade and are uncorrected.

EXAMPLE 1

Dihydro-3-(4-hydroxy-1-phenethyl-4-piperidyl)-2(3H)-furanone

A solution of 18.5 g. of phenethyl bromide in 10 cc. of dimethyl formamide is added dropwise at 50° while stirring to a suspension of 18.5 g. of dihydro-3-(4-hydroxy-4-piperidyl)-2(3H)-furanone and 15.3 g. of potassium carbonate in 50 cc. of dimethyl formamide. The reaction mixture is stirred at 50° for 3 hours and after cooling it is poured into 400 cc. of water, extraction is effected with chloroform, the chloroform extracts are washed with water, drying is effected over magnesium sulphate and the solvent is removed by evaporation. The crystalline residue is recrystallized twice from acetone, whereby the title compound, having a M.P. of 106–108°, is obtained.

M.P. of the hydrochloride 206–207° (from ethanol).

The following compounds of Formula I may also be obtained in a manner analogous to that described in Example 1 (Examples 2 to 5):

EXAMPLE 2

3-(1-p-chloro-phenethyl-4-hydroxy-4-piperidyl)-dihydro-2(3H)-furanone

M.P. 113–114°.

EXAMPLE 3

3-(1-p-bromo-phenethyl-4-hydroxy-4-piperidyl)-dihydro-2(3H)-furanone

M.P. 115–117°.

EXAMPLE 4

Dihydro-3-(4-hydroxy-4-piperidyl-1-p-tolylethyl)-2(3H)-furanone

M.P. 106–107°.

EXAMPLE 5

Dihydro-3-(4-hydroxy-1-p-methoxy-phenethyl-4-piperidyl)-2(3H)-furanone

M.P. 117–119°.

EXAMPLE 6

3-(1-o-chloro-phenethyl-4-hydroxy-4-piperidyl)-dihydro-2(3H)-furanone

A solution of 21.9 g. of o-chloro-penethyl bromide in 50 cc. of dimethyl formamide is added dropwise at 60° within 1½ hours and while stirring to a suspension of 18.5 g. of dihydro-3-(4-hydroxy-4-piperidyl)-2(3H)-furanone and 16.5 g. of potassium carbonate in 100 cc. of dimethyl formamide. The mixture is subsequently allowed to react at the same temperature for 1½ hours and is then poured into 800 cc. of a 57% potassium carbonate solution to which 200 g. of ice have been added. Extraction is repeatedly effected with chloroform, the extracts are dried over magnesium sulphate and the solvent is removed by evaporation at reduced pressure. The resulting residue which crystallizes slowly is recrystallized from benzene/petroleum ether. M.P. 92–94°.

The following compounds of Formula I may also be obtained in a manner analogous to that described in Example 6 (Examples 7 and 8):

EXAMPLE 7

3-(1-m-chlorophenethyl-4-hydroxy-4-piperidyl)-dihydro-2(3H)-furanone

M.P. 76–78°.

EXAMPLE 8

3-(1-p-amino-phenethyl-4-hydroxy-4-piperidyl)-dihydro-2(3H)-furanone

M.P. 145–146°.

EXAMPLE 9

Dihydro-3-(4-hydroxy-1-o-methoxy-phenethyl-4-piperidyl)-2(3H)-furanone

A solution of 19.1 g. of o-methoxy-phenethyl bromide in 50 cc. of dimethyl formamide is added dropwise at a temperature of 60° and while stirring to a suspension of 16.5 g. of dihydro-3-(4-hydroxy-3-piperidyl)-2(3H)-furanone and 14.8 g. of potassium carbonate in 165 cc. of dimethyl formamide. The reaction mixture is allowed to react at 60° for a further 3 hours and is then poured into 500 cc. of a 5% potassium carbonate solution containing about 500 g. of ice. Extraction is effected with methylene chloride, the extracts are dried over magnesium sulphate and the solvent is removed by evaporation at reduced pressure, the residue is dried at 80° for 1 hour in a water jet vacuum in order to remove the remaining dimethyl formamide, and the residue is recrystallized twice from benzene. M.P. 98–99°.

The following compounds of Formula I may also be obtained in a manner analogous to that described in Example 9 (Examples 10 to 20):

EXAMPLE 10

Dihydro-3-(4-hydroxy-1-m-methoxy-phenethyl-4-piperidyl)-2(3H)-furanone

M.P. 98.5–99.5°.

EXAMPLE 11

Dihydro-3-(4-hydroxy-4-piperidyl)-1-o-tolylethyl)-2(3H)-furanone

M.P. of the hydrobromide 193–194°.

EXAMPLE 12

Dihydro-3-(4-hydroxy-4-piperidyl-1-m-tolylethyl)-2(3H)-furanone

M.P. 103–104°.

EXAMPLE 13

3-(1-p-fluoro-phenethyl-4-hydroxy-4-piperidyl)-dihydro-2(3H)-furanone

M.P. 92–93°.

EXAMPLE 14

3-(1-m-fluoro-phenethyl-4-hydroxy-4-piperidyl)-dihydro-2(3H)-furanone

M.P. of the hydrochloride 205–206°.

EXAMPLE 15

3-(1-o-fluoro-phenethyl-4-hydroxy-4-piperidyl)-dihydro-2(3H)-furanone

M.P. 123–124°.

EXAMPLE 16

3-(1-m-trifluoromethyl-phenethyl-4-hydroxy-4-piperidyl)-dihydro-2(3H)-furanone

M.P. of the hydrochloride 165–167°.

EXAMPLE 17

3-(1-o-trifluoromethyl-phenethyl-4-hydroxy-4-piperidyl)-dihydro-2(3H)-furanone

M.P. of the hydrochloride 215–216°.

EXAMPLE 18

3-(1-o-cyano-phenethyl-4-hydroxy-4-piperidyl)-dihydro-2(3H)-furanone

M.P. of the hydrochloride 207.5–208.5° (decomp.).

EXAMPLE 19

Dihydro-3-(4-hydroxy-1-phenethyl-4-piperidyl)-5-methyl-2(3H)-furanone

M.P. 129–130°.

EXAMPLE 20

3-(1-p-acetamido-phenethyl-4-hydroxy-4-piperidyl)-dihydro-2(3H)-furanone

M.P. 193–195°.

EXAMPLE 21

Dihydro-3-(4-hydroxy-1-phenethyl-4-piperidyl)-5-methyl-2(3H)-furanone

A solution of a mixture of 20.3 g. of 1-phenethyl-4-piperidone and 50 g. of γ-valerolactone in 100 cc. of technical grade water-free toluene is added dropwise at a temperature of —10° C., while stirring and in an atmosphere of nitrogen, to a suspension of 11.3 g. of sodium amide in 220 cc. of technical grade absolute toluene. The reaction mixture is stirred at —10° for 22 hours and is then decomposed at —4° with 100 cc. of a 10% potassium carbonate solution. Extraction is effected with toluene and chloroform, the combined extracts are dried over magnesium sulphate and the solvent is removed by evaporation. The crystalline residue is recrystallized twice from benzene, whereby the title compound, having a M.P. of 129–130°, is obtained.

EXAMPLE 22

Dihydro-3-(4-hydroxy-1-phenethyl-4-piperidyl)-2(3H)-furanone

A mixture of 210 g. of γ-butyrolactone and 100 g. of 1-phenethyl-4-piperidone is added dropwise at —10° to a suspension of 112 g. of sodium amide in 1000 cc. of technical grade water-free toluene. The reaction mixture is then allowed to react over night at —10° and is subsequently decomposed with water while cooling with ice. The aqueous phase is separated and again extracted twice with toluene. The combined toluene extracts are dried over magnesium sulphate, the solvent is removed by evaporation at reduced pressure and the resulting residue is recrystallized twice from benzene. M.P. 106–108°.

EXAMPLE 23

3-(1-o-chloro-phenethyl-4-hydroxy-4-piperidyl)-dihydro-2(3H)-furanone

A solution of 22 g. of o-chloro-phenethyl bromide in 100 cc. of dimethyl formamide is added dropwise at 60° while stirring to a suspension of 18.0 g. of 4-piperidone ethylene ketal hydrochloride and 34.5 g. of potassium carbonate in 300 cc. of dimethyl formamide. The reaction mixture is then allowed to react at the same temperature for a further 2 hours and is then poured into about 1000 cc. of ice water. Extraction is repeatedly effected with chloroform, the extracts are washed with water, dried over magnesium sulphate, and the solvent is removed by evaporation at reduced pressure. The resulting residue is taken up in 300 cc. of 2 N hydrochloric acid, extraction is effected once with ether, and the aqueous phase is subsequently boiled at reflux for 8 to 10 hours. The reaction mixture is made alkaline by the addition of potassium carbonate, extraction is repeatedly effected with chloroform, and after drying over magnesium sulphate, the solvent is removed by evaporation.

The above evaporation residue and 43 g. of γ-butyrolactone are dissolved in 100 cc. of technical grade water-free toluene, and the solution is added dropwise to a suspension of 11.3 g. of sodium amide in 250 cc. of technical grade absolute toluene at —10°. The process is then continued as described in Example 22. The crude product is recrystallized twice from benzene/petroleum ether, whereby the pure title compound, having a M.P. of 92–94°, is obtained.

The following compounds of Formula I may also be obtained in a manner analogous to that described in Example 23 (Examples 24 to 28):

EXAMPLE 24

3-(1-m-chloro-phenethyl-4-hydroxy-4-piperidyl)-dihydro-2(3H)-furanone

M.P. 76–78° (from benzene/petroleum ether).

EXAMPLE 25

3-(1-p-chloro-phenethyl-4-hydroxy-4-piperidyl)-dihydro-2(3H)-furanone

M.P. 113–114° (from benzene).

EXAMPLE 26

Dihydro-3-(4-hydroxy-1-p-methoxy)phenethyl-4-piperidyl)-2(3H)-furanone

M.P. 117–119° (from benzene).

EXAMPLE 27

Dihydro-3-(4-hydroxy-1-p-tolylethyl-4-piperidyl)-2(3H)-furanone

M.P. 106–107° (from benzene).

EXAMPLE 28

3-(1-p-bromo-phenethyl-4-hydroxy-4-piperidyl)-dihydro-2(3H)-furanone

M.P. 115–117° (from benzene).

EXAMPLE 29

5-butyl-dihydro-3-(4-hydroxy-1-phenethyl-4-piperidyl)-2(3H)-furanone

A solution of 50 g. of 5-butyrolactone and 14.3 g. of 1-phenethyl-4-piperidone is adde dropwise at —10° to a suspension of 8.0 g. of sodium amide in 200 cc. of absolute toluene. 5 cc. of absolute tetrahydrofuran and 3.0 g. of tert.butyl hydroperoxide (75% in di-tert.butyl peroxide) are subsequently added, and the mixture is allowed to react overnight at −10°. The reaction mixture is subsequently decomposed by the dropwise addition of 100 cc. of water at a temperature of −5° to 0°. The toluene phase is decanted and the aqueous layer is extracted twice with chloroform. The combined extracts are dried over magnesium sulphate, and after evaporation of the solvent and recrystallization from ether/petroleum ether, the title compound, having a M.P. of 124.5–125.5°, is obtained.

EXAMPLE 30

3-(1-p-amino-phenethyl-4-hydroxy-4-piperidyl)-dihydro-2(3H)-furanone

A solution of 39.6 g. of dihydro-3-(4-hydroxy-1-p-nitro-phenethyl-4-piperidyl)-2(3H)-furanone in 700 cc. of ethanol is hydrogenated in the presence of 1.3 g. of platinum oxide at room temperature and at an initial pressure of 4 atmospheres. After the taking up of hydrogen is complete, the catalyst is filtered off, evaporation to dryness is effected, and the residue is recrystallized from ethanol. The title compound has a M.P. of 145–146°.

EXAMPLE 31

3-(1-o-amino-phenethyl-4-hydroxy-4-piperidyl)-dihydro-2(3H)-furanone

A solution of 17 g. of dihydro-3-(4-hydroxy-1-o-nitro-phenethyl-4-piperidyl)-2(3H)-furanone hydrochloride in 840 cc. of ethanol is hydrogenated at room temperature and at an initial pressure of 4 atmospheres, in the presence of 0.6 g. of platinum oxide. The catalyst is filtered off, the filtrate is evaporated to dryness and the residue is dissolved in chloroform. The base is liberated by extracting with potassium carbonate solution, drying the organic phase over magnesium sulphate, removing the solvent and absorbing the resulting residue on 130 g. of silica gel. The fraction obtained after elution with a mixture of chloroform/methanol 95:5, is dissolved in ethanol, and a solution of the calculated amount of naphthalene-1,5-disulphonic acid in ethanol is added, whereupon the naphthalene-1,5-disulphonate of the title compound crystallizes. M.P. 245–250°.

The starting materials may be obtained as follows:

EXAMPLE 32

Dihydro-3(4-hydroxy-4-piperidyl)-5-methyl-2(3H)-furanone hydrochloride (for Example 19)

(a) 3-(1-benzyl-4-hydroxy-4-piperidyl) - 5 - methyl-dihydro-2(3H)-furanone hydrochloride.—A mixture of 37.8 g. of 1-benzyl-4-piperidone and 80 g. of γ-valerolactone is added dropwise to a suspension of lithium amide in liquid ammonia (produced from 5.6 g. of lithium in 1000 cc. of liquid ammonia). The reaction mixture is allowed to react at −30° for a further 3 hours, and 64 g. of ammonium chloride are then carefully added. The ammonia is then evaporated with the simultaneous dropwise addition of toluene, and the reaction mixture is subsequently stirred at room temperature overnight. The reaction mixture is subsequently decomposed with 200 cc. of water, the organic phase is separated, and extraction is again effected twice with toluene. The solvent is evaporated, and the calculated amount of hydrochloric acid in ethanol is added to the resulting residue in ethanol, whereupon 3-(1-benzyl-4-hydroxy-4-piperidyl)-5-methyl-dihydro-2(3H)-furanone hydrochloride crystallizes. M.P. 209–211°.

(b) Dihydro - 3 - (4-hydroxy-4-piperidyl)-5-methyl-2 (3H)-furanone hydrochloride.—A solution of 33.7 g. of 3 - (1 - benzyl-4-hydroxy-4-piperidyl)-5-methyl-dihydro-2 (3H)-furanone hydrochloride in 400 cc. of glacial acetic acid is hydrogenated at 60° in the presence of 7.5 g. of palladium on charcoal at 11 atmospheres for 13 hours, and at 31 atmospheres for 60 hours. The catalyst is filtered off, the filtrate is evaporated to dryness, and the residue is recrystallized from ethanol. M.P. 198–200°

EXAMPLE 33

Dihydro-3-(4-hydroxy-1-p-nitro-phenethyl-4-piperidyl)-2(3H)-furanone (for Example 30)

A solution of 41 g. of p-nitro-phenethyl bromide in 100 cc. of dimethyl formamide is added dropwise at 50° while stirring to a suspension of 41 g. of dihydro-3-(4-hydroxy-4-piperidyl)-2(3H)-furanone and 36.7 g. of potassium carbonate in 200 cc. of dimethyl formamide. The reaction mixture is stirred at 50° for 3 hours, and after cooling is poured into 1600 cc. of water, extraction is effected with chloroform, the chloroform extracts are washed with water, dried over magnesium sulphate, and the solvent is removed by evaporation. After recrystallizing the crystalline residue twice from benzene/petroleum ether, the title compound, having a M.P. of 126–127°, is obtained.

The following compound of Formula Ib may also be obtained in a manner analogous to that described in Example 33 (Example 34):

EXAMPLE 34

Dihydro-3-(4-hydroxy-1-o-nitro-phenethyl-4-piperidyl)-2(3H)-furanone (for Example 31)

M.P. of the hydrochloride 192–194°.

EXAMPLE 35

Dihydro-3-(4-hydroxy-1-phenethyl-4-piperidyl)-2(3H)-furanone

A solution of 244 g. of 1-phenethyl-4-piperidone and 508 g. of γ-butyrolactone in 1 litre of toluene is added dropwise at a temperature of −10 to −13°, while stirring, to a mixture cooled to the same temperature of a 50% suspension of 272 g. of sodium amide in xylene and 1 litre of toluene. The reaction mixture is stirred for a further 20 minutes, and 100 cc. of dimethyl sulfoxide at the same temperature are added dropwise to the reaction mixture. After a reaction time of 2½ to 3 hours, the sodium salt of the title compound commences to separate as a precipitate which may be readily stirred. After 5½ hours the reaction mixture is sucked by means of a vacuum pump into a mixture of 1.5 kg. of ice, 1 litre of water and 220 cc. of glacial acetic acid, whereby part of the title compound crystallizes. 1.3 litres of chloroform are added to the resulting reaction mixture, the chloroform phase is separated and is concentrated by evaporation on a rotary evaporator after drying over magnesium sulfate. The resulting crude title compound is recrystallized from toluene/benzine. M.P. 106–108°.

EXAMPLE 36

Dihydro-3-(4-hydroxy-1-phenethyl-4-piperidyl)-2 (3H)-furanone

A solution of 203 g. of 1-phenethyl-4-piperidone and 420 g. of γ-butyrolactone in 200 cc. of toluene is added dropwise at a temperature of −10° to a mixture cooled to the same temperature of a 50% suspension of 225 g. of sodium amide in xylene, 2 litres of toluene and 5 cc. of tert.-butyl hydroperoxide. In case the reaction does not commence after 1 hour, 60 to 100 cc. of tetrahydrofuran and 1 g. of benzoyl peroxide are added. After a reaction time of 20 hours at −10°, the viscous, yellowish reaction mixture is sucked by means of a vacuum pump into a mixture of 1 litre of water, 1 kg. of ice and 180 cc. of glacial acetic acid, and the aqueous phase is separated and extracted twice with 1.5 litres of chloroform. The combined organic phases are washed with 2 litres of common salt solution, dried over magnesium sulfate and concentrated on a rotary evaporator after decoloration with 10 g. of carbon. The resulting crude title compound is recrystallized from toluene/benzine with the addition of carbon. M.P. 106–108°.

What is claimed is:

1. A compound of the formula:

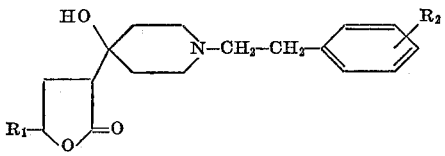

wherein $R_1$ is hydrogen or lower alkyl, and $R_2$ is hydrogen, fluorine, chlorine, bromine, lower alkyl, lower alkoxy or lower alkylthio, cyano, amino or trifluoromethyl, or —NHCOR$_3$, wherein $R_3$ is lower alkyl, or a pharmaceutically acceptable acid addition salt thereof.

2. The compound of claim 1, which is dihydro-3-(4-hydroxy-1-phenethyl-4-piperidyl)-2(3H)-furanone.

3. The compound of claim 1, which is 3-(1-p-chlorophenethyl - 4 - hydroxy-4-piperidyl)-dihydro-2(3H)-furanone.

4. The compound of claim 1, which is 3-(1-p-bromophenethyl - 4 - hydroxy-4-piperidyl)-dihydro-2(3H)-furanone.

5. The compound of claim 1, which is dihydro-3-(4-hydroxy-4-piperidyl-1-p-tolylethyl)-2(3H)-furanone.

6. The compound of claim 1, which is dihydro-3-(4-hydroxy - 1 - p-methoxy-phenethyl-4-piperidyl)-2(3H)-furanone.

7. The compound of claim 1, which is 3-(1-o-chlorophenethyl - 4 - hydroxy-4-piperidyl)-dihydro-2(3H)-furanone.

8. The compound of claim 1, which is 3-(1-m-chlorophenethyl - 4 - hydroxy-4-piperidyl)-dihydro-2(3H)-furanone.

9. The compound of claim 1, which is 3-(1-p-aminophenethyl - 4 - hydroxy-4-piperidyl)-dihydro-2(3H)-furanone.

10. The compound of claim 1, which is dihydro-3-(4-hydroxy - 1 - o - methoxy-phenethyl-4-piperidyl)-2(3H)-furanone.

11. The compound of claim 1, which is dihydro-3-(4-hydroxy - 1 - m - methoxy-phenethyl-4-piperidyl)-2(3H)-furanone.

12. The compound of claim 1, which is dihydro-3-(4-hydroxy-4-piperidyl-1-o-tolylethyl)-2(3H)-furanone.

13. The compound of claim 1, which is dihydro-3-(4-piperidyl-1-m-tolylethyl)-2(3H)-furanone.

14. The compound of claim 1, which is 3-(1-p-fluorophenethyl - 4 - hydroxy-4-piperidyl)-dihydro-2(3H)furanone.

15. The compound of claim 1, which is 3-(1-m-fluorophenethyl - 4 - hydroxy-4-piperidyl)-dihydro-2(3H)-furanone.

16. The compound of claim 1, which is 3-(1-o-fluorophenethyl - 4 - hydroxy-4-piperidyl)-dihydro-2(3H)-furanone.

17. The compound of claim 1, which is 3-(1-m-trifluoromethyl - phenethyl - 4 - hydroxyl-4-piperidyl)-dihydro-2(3H)-furanone.

18. The compound of claim 1, which is 3-(1-o-trifluoromethyl - phenethyl - 4 - hydroxy - 4 - piperidyl)-dihydro-2(3H)-furanone.

19. The compound of claim 1, which is 3-(1-o-cyanophenethyl - 4 - hydroxy-4-piperidyl)-dihydro-2(3H)-furanone.

20. The compound of claim 1, which is dihydro-3-(4-hydroxy-1-phenethyl-4-piperidyl)-5-methyl-2(3H) - furanone.

21. The compound of claim 1, which is 3-(1-p-acetamidophenethyl - 4 - hydroxy - 4 - piperidyl) - dihydro-2(3H)-furanone.

22. The compound of claim 1, which is 5-butyl-dihydro - 3 - (4-hydroxy-1-phenethyl-4-piperidyl)-2(3H)-furanone.

23. The compound of claim 1, which is 3-(1-o-aminophenethyl - 4 - hydroxy-4-piperidyl)-dihydro-2(3H)-furanone.

References Cited
UNITED STATES PATENTS

| | | | |
|---|---|---|---|
| 3,074,952 | 1/1963 | Casy et al. | 260—293.8 |
| 3,080,372 | 3/1963 | Janssen | 260—293.8 |
| 3,531,480 | 9/1970 | Jucker et al. | 260—293.67 |

HENRY R. JILES, Primary Examiner

S. D. WINTERS, Assistant Examiner

U.S. Cl. X.R.

260—293.66, 293.8, 343.6, 471 A; 424—267